United States Patent [19]

Chen

[11] Patent Number: 5,651,754
[45] Date of Patent: Jul. 29, 1997

[54] WHEEL ASSEMBLY ADAPTED TO BE MOUNTED ON A WHEEL-BEARING TUBE OF AN EXERCISER WITHOUT THE NEED FOR A LOCKING BOLT

[76] Inventor: Ping Chen, No. 29, Nan-Mei St., Taichung, Taiwan

[21] Appl. No.: 688,379

[22] Filed: Jul. 30, 1996

[51] Int. Cl.⁶ .................................................. A63B 69/06
[52] U.S. Cl. ................................................ 482/57
[58] Field of Search ........................... 482/57, 52, 59, 482/62, 63, 64, 65, 53, 54; 280/87.1, 642, 647, 87.051, 87.021, 87.03, 87.041; 248/98, 129; 16/45, 1 R, 18 R, 19, 27

[56] References Cited

U.S. PATENT DOCUMENTS

| | | | |
|---|---|---|---|
| 2,456,939 | 12/1948 | Haase | 280/87.1 |
| 4,733,858 | 3/1988 | Lan | 482/52 |
| 5,439,432 | 8/1995 | Lundin et al. | 482/53 |
| 5,453,066 | 9/1995 | Richter, Jr. | 482/57 |

*Primary Examiner*—Stephen R. Crow
*Attorney, Agent, or Firm*—Ladas & Parry

[57] ABSTRACT

A wheel assembly of an exerciser includes a wheel-mounting member, and an annular wheel. The wheel-mounting member includes a tubular peripheral wall with an inner portion and an outer portion which has a closing end wall. The peripheral wall has an outer outward flange unit near the end wall and an inner outward flange unit on the inner portion to define a wheel-mounting space therebetween. The peripheral wall has a plurality of axially extending slots therethrough to define a plurality of flexible jaws, each of which is located between an adjacent pair of the slots. The wheel is sleeved on the wheel-mounting member between the inner and outer outward flange units and has an intermediate narrowed inner wall section and two enlarged end inner wall sections which are located on two opposite sides of the narrowed inner wall section and which receive the inner and outer outward flange units respectively so as to avoid removal of the wheel from the wheel-mounting member after the latter is sleeved on the wheel-bearing tube of the exerciser.

5 Claims, 8 Drawing Sheets

WHEEL ASSEMBLY ADAPTED TO BE MOUNTED ON A WHEEL-BEARING TUBE OF AN EXERCISER WITHOUT THE NEED FOR A LOCKING BOLT

BACKGROUND OF THE INVENTION

1. Field of the Invention

This invention relates to a wheel assembly for an exerciser, more particularly to an exerciser wheel assembly wherein a wheel can be mounted to a wheel-bearing tube of the exerciser without the assistance of a locking bolt.

2. Description of the Related Art

Figure 1:
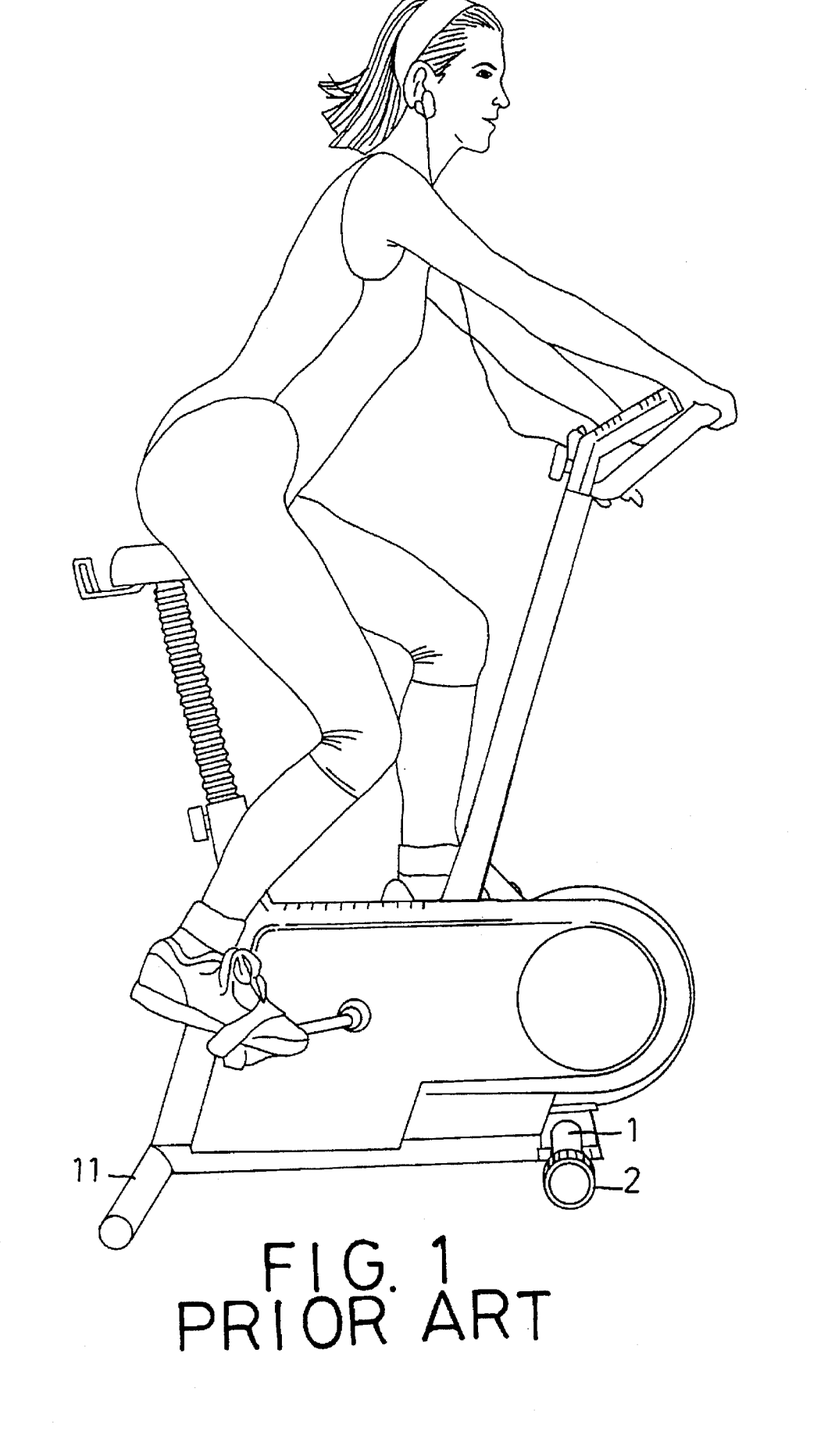
FIG. 1 shows a pedal-type exerciser provided with a conventional wheel assembly.
Figure 2:
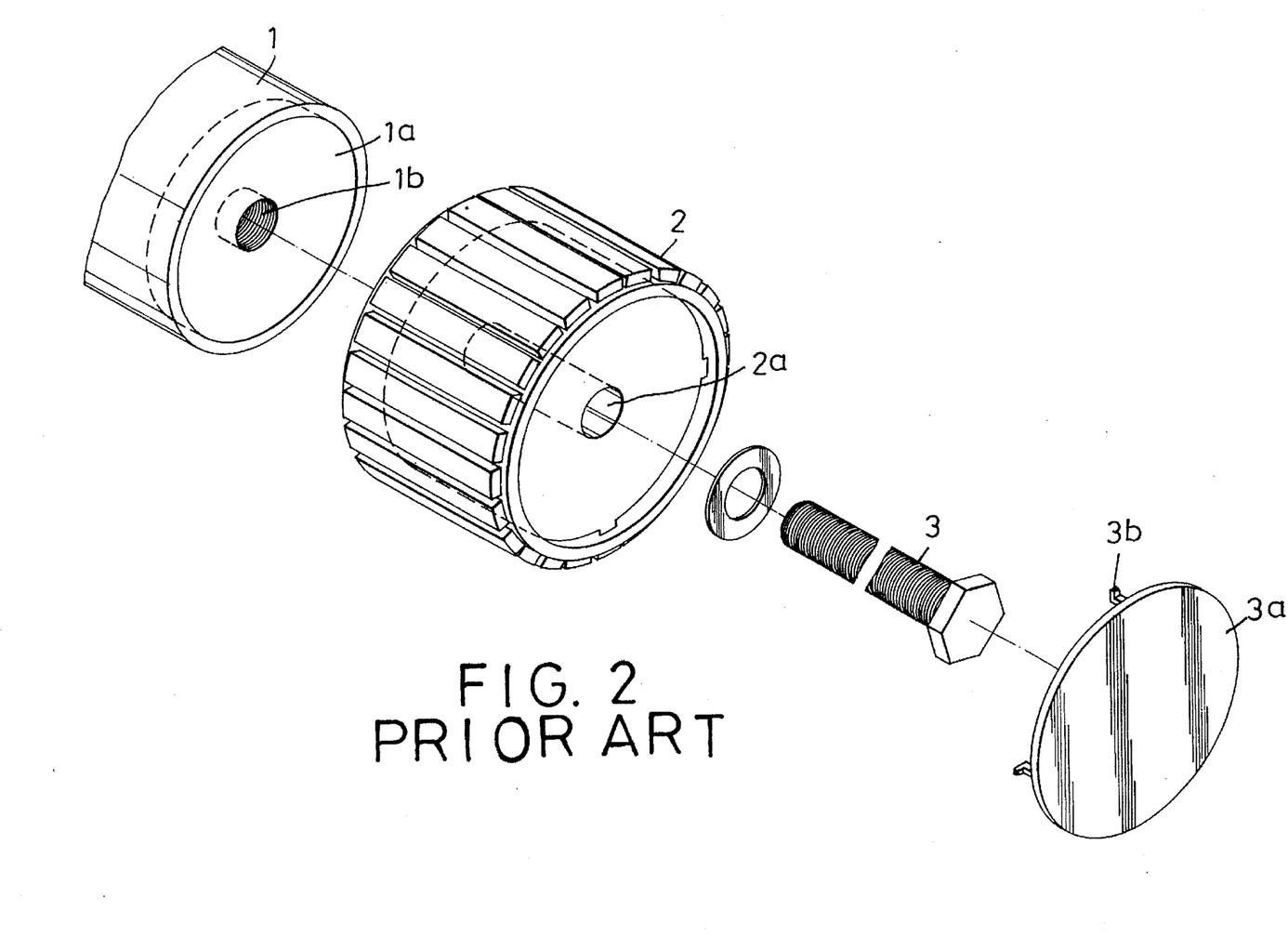
FIG. 2 is an exploded view of the conventional wheel assembly to be mounted on a horizontal wheel-bearing tube of the exerciser shown in FIG. 1.

The improvement of this invention is directed to the conventional exerciser wheel assembly shown in FIG. 2 which includes an annular wheel 2. A locking bolt 3 is passed through the central hole 2a of the wheel 2 to engage the threaded hole 1b in an end portion 1a of a wheel-bearing tube 1 of the exerciser shown in FIG. 1. Thus, the wheel 2 can rotate on the tube 1. A decorated cap 3a is press fitted into the wheel 2 and has a plurality of resilient outward hooks 3b engaging the groove formed in the wheel 2. Normally, the conventional exerciser is equipped with two rotatable wheels on the front side and a fixed stand 11 on the rear side. When one desires to move the exerciser on the floor, the stand 11 of the exerciser must be raised so that the rotatable wheels 2 can move on the floor by pushing the exerciser, thereby conveniencing the user.

A disadvantage of the conventional wheel assembly resides in that it is necessary to form a threaded hole 1b in the end portion 1a of the wheel-bearing tube 1 prior to fixing the locking bolt 3 so as to mount the wheel 2 on the wheel-bearing tube 1. This incurs extra manufacture expenses and results in a longer assembly time.

SUMMARY OF THE INVENTION

The object of this invention is to provide an exerciser wheel assembly that is adapted to be mounted on a wheel-bearing tube of the exerciser without the assistance of a locking bolt.

Accordingly, the wheel assembly of this invention is adapted to be mounted on an open outer end of a horizontal wheel-bearing tube of an exerciser and includes a plastic tubular wheel-mounting member, and an annular wheel. The wheel-mounting member includes a peripheral wall provided with an inner portion which has an open end for extension of the wheel-bearing tube, and an outer portion which has a closing end wall that is formed with an axially extending annular flange projecting from an inner side surface of the closing end wall. The annular flange and the peripheral wall cooperatively define an annular groove therebetween to receive the open outer end of the wheel-bearing tube when the open outer end of the tube is inserted into the wheel-mounting member via the inner portion in such a manner that the wheel-mounting member is fixed on the wheel-bearing tube. The peripheral wall has an outer outward flange unit adjacent to the closing end wall and an inner outward flange unit which is located on the inner portion thereof. The inner and outer outward flange units project radially and outwardly from the peripheral wall so as to define a wheel-mounting space therebetween. The peripheral wall has a plurality of axially extending slots which are formed therethrough and which are open at the open end of the inner portion in the wheel-mounting member so as to define a plurality of flexible jaws, each of which is located between an adjacent pair of the slots. The inner outward flange unit is located on the jaws. The wheel is sleeved on the wheel-mounting member between the inner and outer outward flange units and has an intermediate narrowed inner wall section and two enlarged end inner wall sections which are located on two opposite sides of the narrowed inner wall section and which receive the inner outward flange unit and the outer outward flange unit respectively. The intermediate narrowed inner wall section has an inner diameter slightly smaller than the outer diameter of the inner outward flange unit so that the inner outward flange unit can be compressed due to flexibility of the jaws so as to permit entrance of the wheel into the wheel-mounting space of the wheel-mounting member during assembly. After assembly, because the tube is received fittingly within the wheel-mounting member, the jaws cannot be compressed so as to avoid removal of the wheel from the wheel-mounting member.

BRIEF DESCRIPTION OF THE DRAWINGS

Other features and advantages of this invention will become apparent in the following detailed description of the preferred embodiments of this invention, with reference to the accompanying drawings, in which.

DETAILED DESCRIPTION OF THE PREFERRED EMBODIMENTS

Before the present invention is described in greater detail, it should be noted that the same reference numerals have been used to denote like elements throughout the disclosure.

Figure 3:
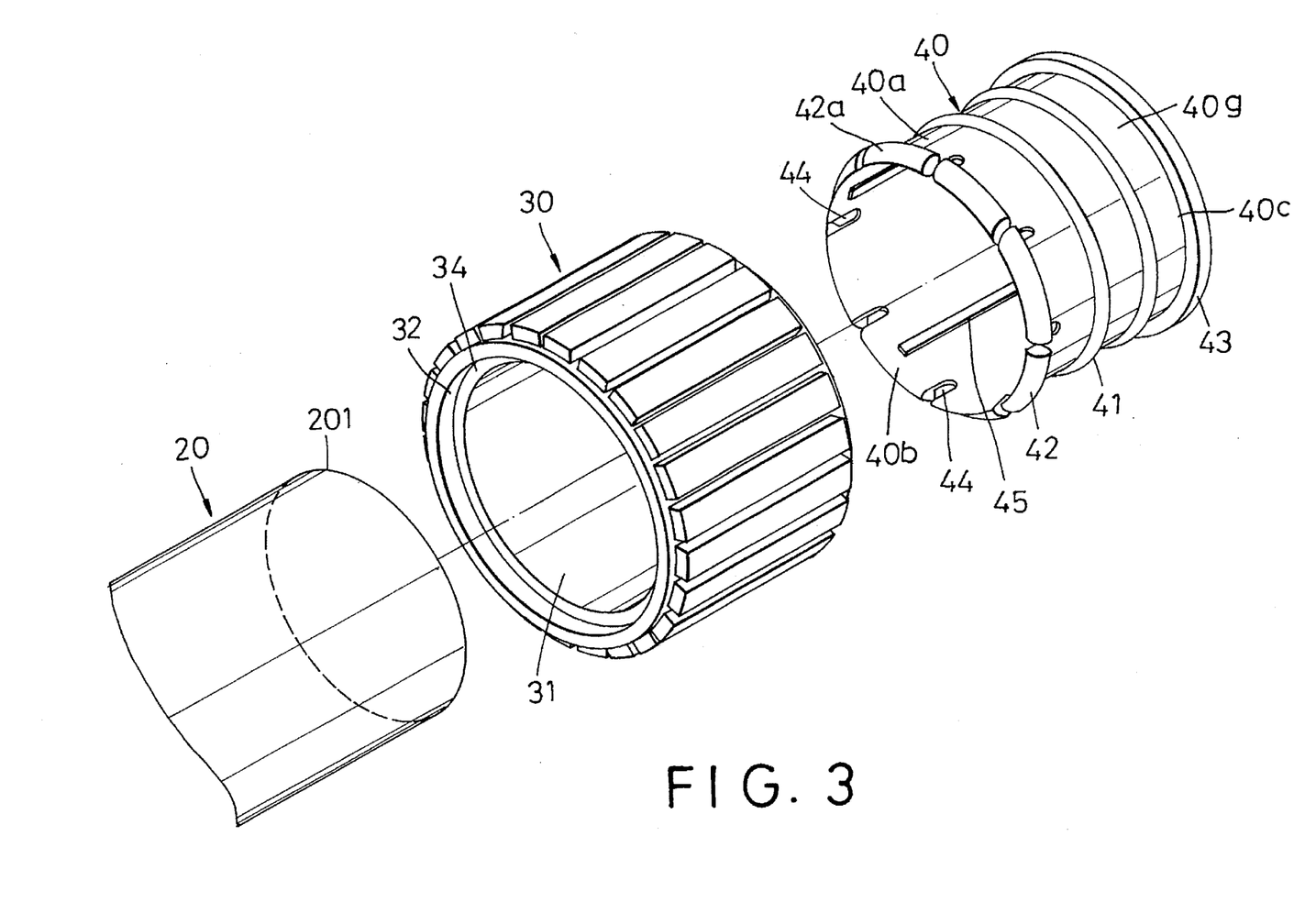
FIG. 3 is an exploded view of a first preferred embodiment of an exerciser wheel assembly according to this invention, the wheel assembly being adapted to be mounted on the horizontal wheel-bearing tube of the exerciser shown in FIG. 1.
Figure 4:
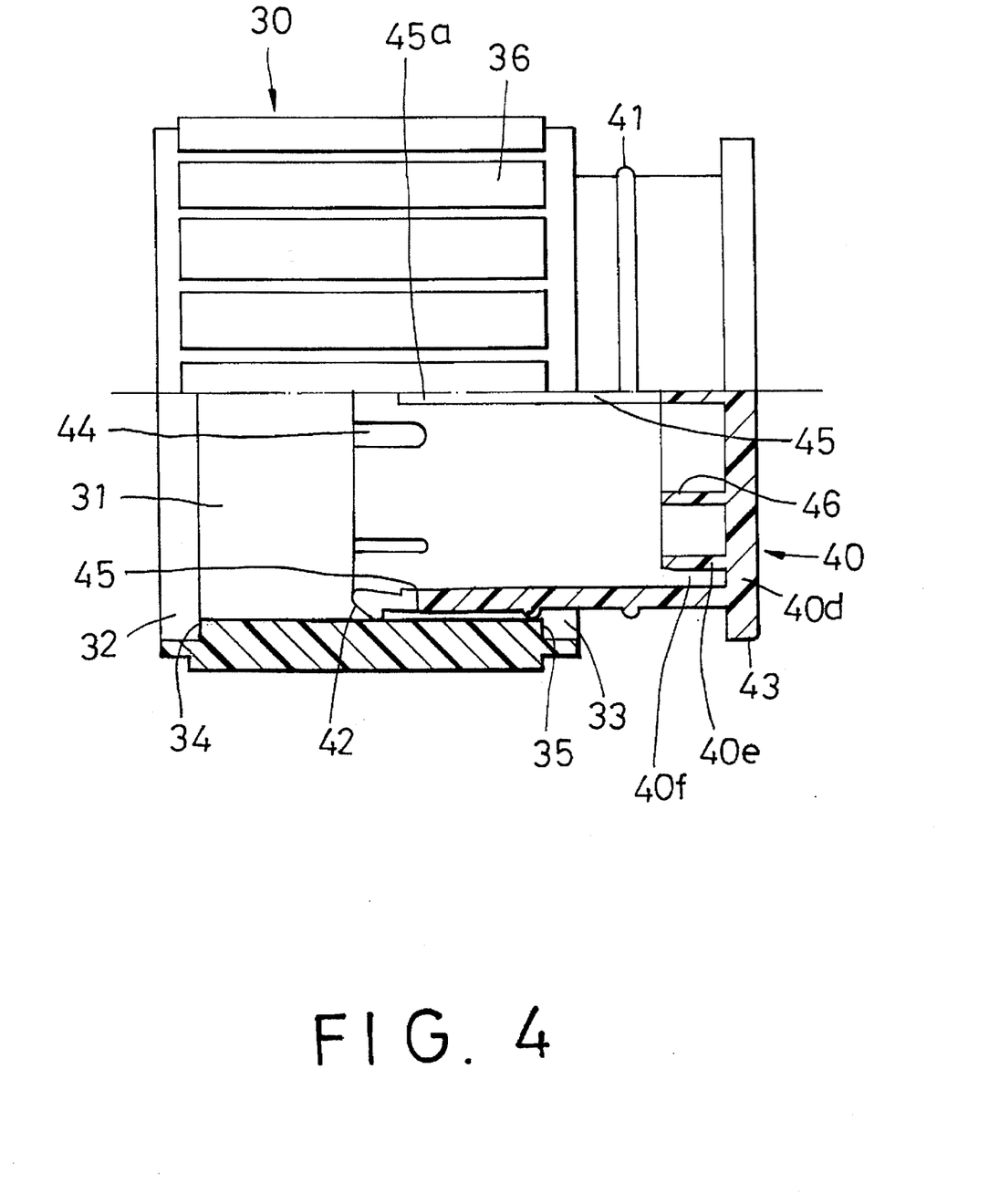
FIG. 4 illustrates how a wheel is sleeved over a wheel-mounting member according to this invention.
Figure 5:
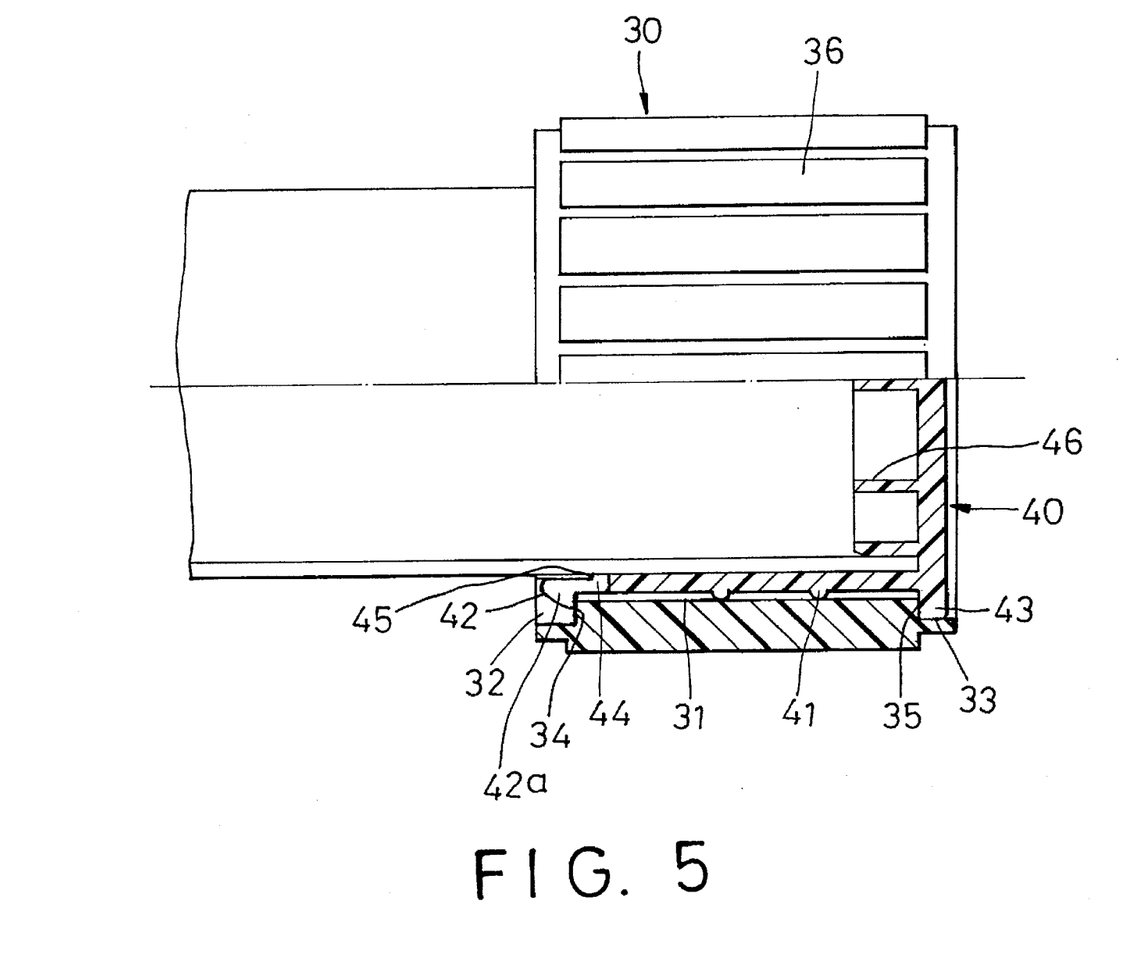
FIG. 5 is a partly sectional view of the wheel assembly of this invention when mounted on the wheel-bearing tube of the exerciser shown in FIG. 1.

Referring to FIGS. 3, 4 and 5, the first preferred embodiment of a wheel assembly according to this invention is shown and to be mounted on a horizontally extending plastic wheel-bearing tube 20 of an exerciser (not shown). The wheel assembly includes a plastic tubular wheel-mounting member 40 and an annular rubber wheel 30.

As illustrated, the wheel mounting member 40 includes a peripheral wall 40a provided with an inner portion 40b which has an open end, and an outer portion 40c which has a closing end wall 40d that is formed with an axially extending annular flange 40e. The annular flange 40e projects from an inner side surface of the end wall 40d so as to define cooperatively an annular groove 40f between the annular flange 40e and the peripheral wall 40a. The peripheral wall 40a has an inner diameter slightly larger than the outer diameter of the wheel-bearing tube 20 so that, when the latter is inserted into the wheel-mounting member 40 via the inner portion 40b, the open outer end 201 of the wheel-bearing tube 20 is received fittingly in the annular groove 40f in such a manner that the wheel-mounting member 40 is fixed on the wheel-bearing tube 20. The peripheral wall 40a has an integral outer outward flange unit 43 projecting radially and outwardly from the end wall 40d, and an integral inner outward flange unit 42 located on the inner portion 40b thereof. Because the inner and outer outward flange units 42, 43 project radially and outwardly from the peripheral wall 40a, a wheel-mounting space 40g is defined between the flange units 42, 43. The peripheral wall 40a further has two axially spaced-apart small flanges 41 which project radially and outwardly therefrom and which are located between the inner and outer outward flange units 42, 43, and a plurality of axially extending slots 44 which are formed through the peripheral wall 40a and which are open at the open end of the inner portion 40b in the wheel-mounting member 40 so as to define a plurality of flexible jaws 42a. Each of the jaws 42a is located between an adjacent pair of the axially extending slots 44. The inner outward flange unit 42 is located on the jaws 42a. Note that the small flanges 41 have outer diameters smaller than those of the inner and outer outward flange units 42, 43.

The annular wheel 30 has an intermediate narrowed inner wall section 31 and two enlarged end inner wall sections 32, 33 which are located on two opposite sides of the narrowed inner wall section 31 so as to define two shoulders 34, 35. The intermediate narrowed inner wall section 31 has an inner diameter slightly smaller than the outer diameter of the inner outward flange unit 42 so that, during assembly, the inner outward flange unit 42 can be compressed radially and inwardly due to flexibility of the jaws 40a so as to permit entrance of the wheel 30 into the wheel-mounting space 40g of the wheel-mounting member 40. After assembly, the inner and outer outward flange units 42, 43 of the wheel-bearing member 40 are respectively received in the enlarged inner wall sections 32, 33 of the wheel 30 respectively such that the jaws 42a cannot be compressed by the enlarged wall section 32. The jaws 42a on the inner portion 40b of the wheel-mounting member 40 have back-curving end sections which abut on the shoulder 34 of the wheel 30 so as to avoid removal of the wheel 30 from the wheel-mounting member 40. At this time, because the wheel 30 is not in contact with the entire outer surface of the wheel-mounting member 40, the wheel 30 can rotate on the wheel-mounting member 40 with little friction occurring therebetween.

In this embodiment, the peripheral wall 40a further has a plurality of axially extending longitudinal engagement ribs 45 and a plurality of axially extending short reinforcing ribs 46 formed integrally on an inner surface thereof. Each of the engagement ribs 45 has an inner end portion 45a (see FIG. 4) located between adjacent two of the slots 44 in such a manner that the inner end portion 45a thereof and the respective jaw 42a simultaneously expand radially and outwardly during insertion of the open outer end 201 of the wheel-bearing tube 20 (see FIG. 3) into the wheel-mounting member 40. Thus, the engagement ribs 45 are pressed against the outer surface of the wheel-bearing tube 20 so as to further help fix the wheel-mounting member 40 on the wheel-bearing tube 20.

Figure 6:
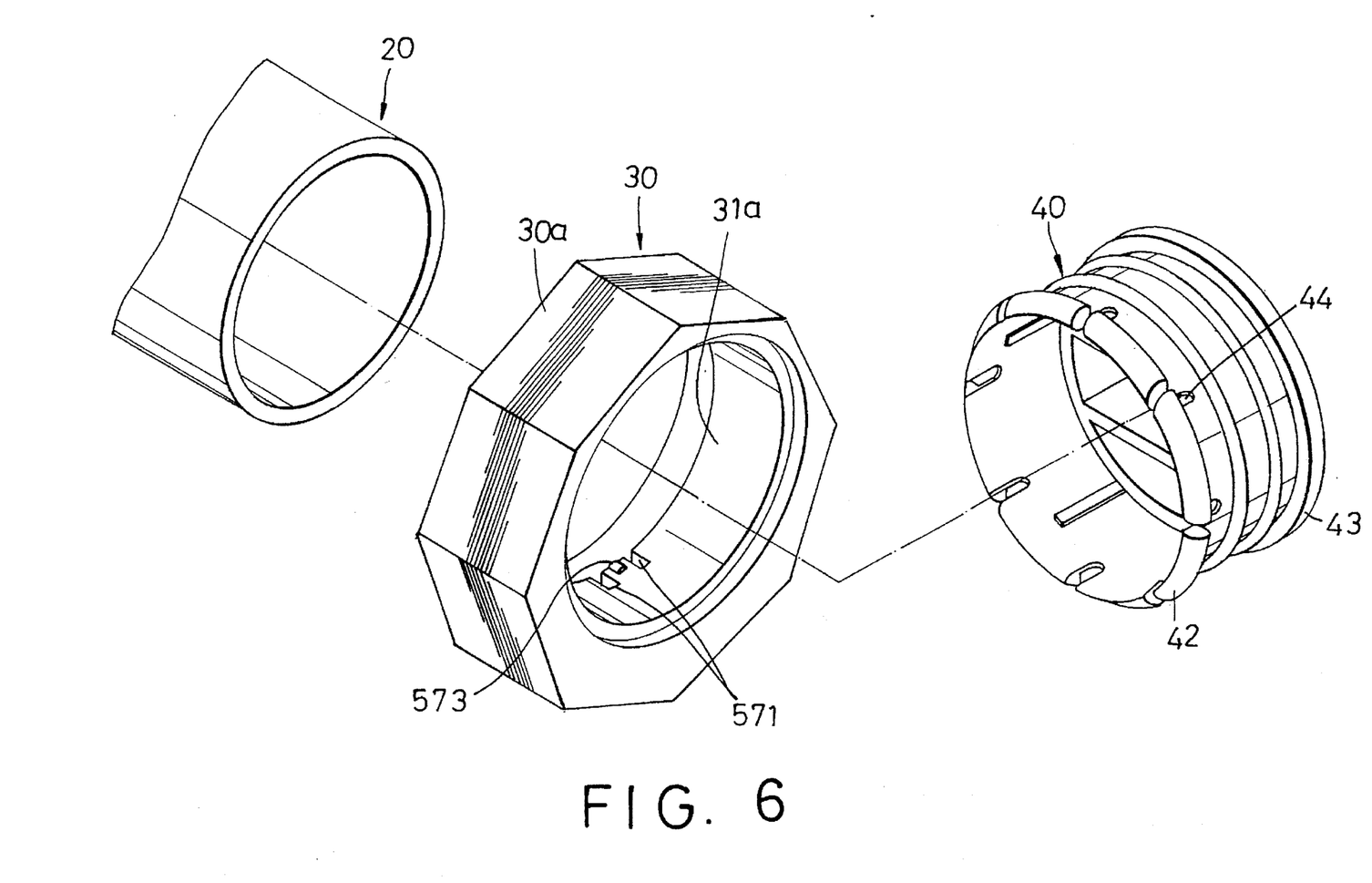
FIG. 6 is an exploded view of a second preferred embodiment of this invention shown together with the horizontal wheel-bearing tube of the exerciser shown in FIG. 1.
Figure 7:
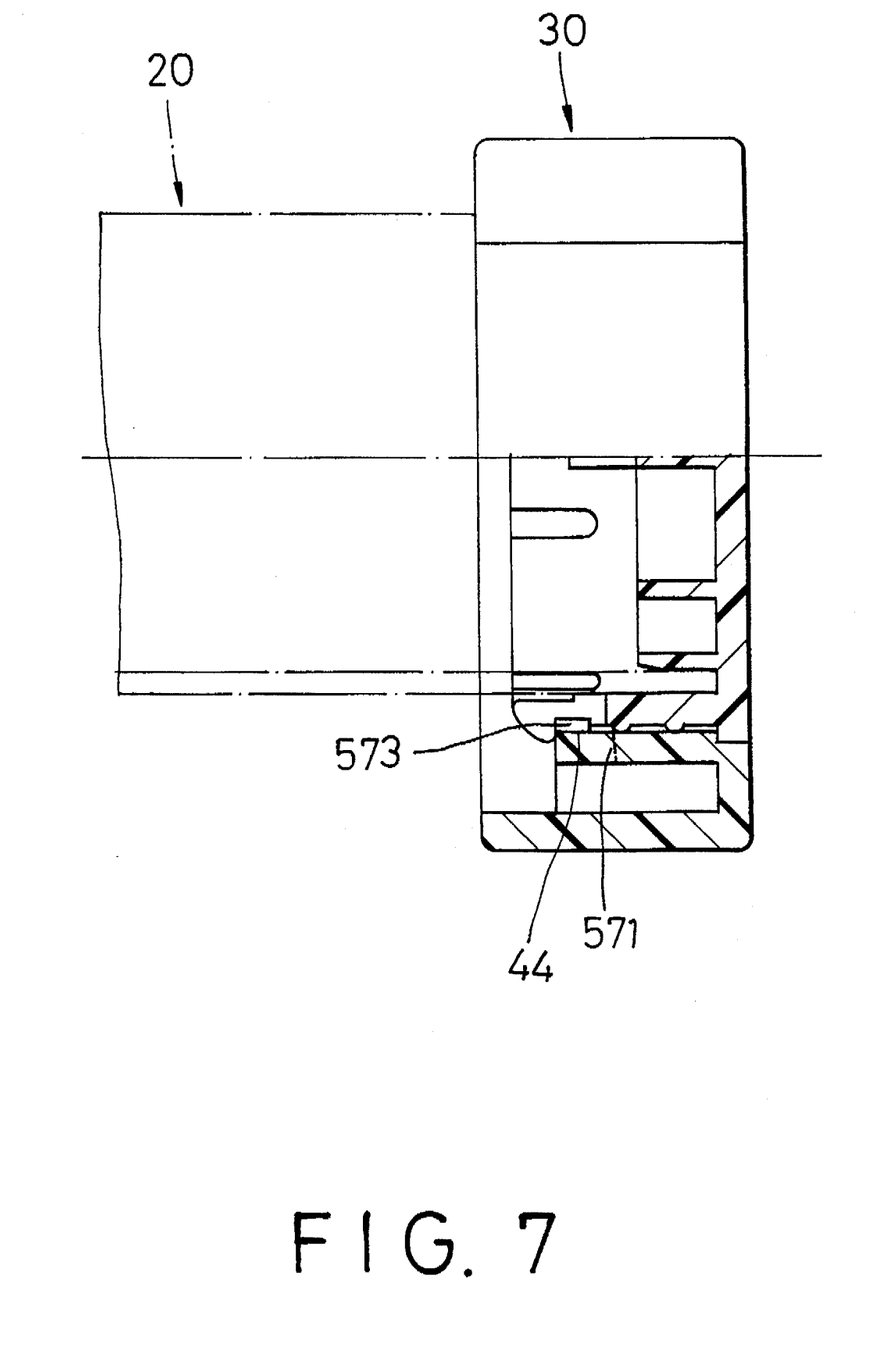
FIG. 7 is a partly sectional view of the second preferred embodiment of this invention when mounted on the horizontal wheel-bearing tube of the exerciser shown in FIG. 1, illustrating how the wheel is fixed on the wheel-mounting member.

Referring to FIGS. 6 and 7, the second preferred embodiment of this invention is shown to be generally similar to the first preferred embodiment in structure except that the wheel 30 employed therein is eccentric and has two closely spaced axial grooves 571 formed in the intermediate inner wall section 31a and a resilient engagement tongue 573 that projects radially and inwardly from the intermediated inner wall section 31a. When the eccentric wheel 30 is sleeved onto the wheel-mounting space which is defined between the inner and outer outward flange units 42, 43, the engagement tongue 573 can extend into a selected one of the slots 44 so as to prevent rotation of the eccentric wheel 30 on the wheel-mounting member 40, thereby retaining the eccentric wheel 30 stationarily on the wheel-mounting member 40. When desired, the engagement tongue 573 can be moved forcibly from the selected one of the slots 44 to another by pushing the eccentric wheel 30 to rotate on the wheel-mounting member 40 so as to vary the height of the rotating axis of the eccentric wheel 30.

Note that the eccentric wheel 30 has a multi-sided polygonal outer periphery with eight rectangular surfaces 30a. Normally, an exerciser is equipped with two eccentric wheels on one side and two rotatable wheels on the opposite side. In the event that the exerciser is used on an uneven ground, the eccentric wheels can be forcibly rotated so as to compensate the unevenness thereof.

Figure 8:
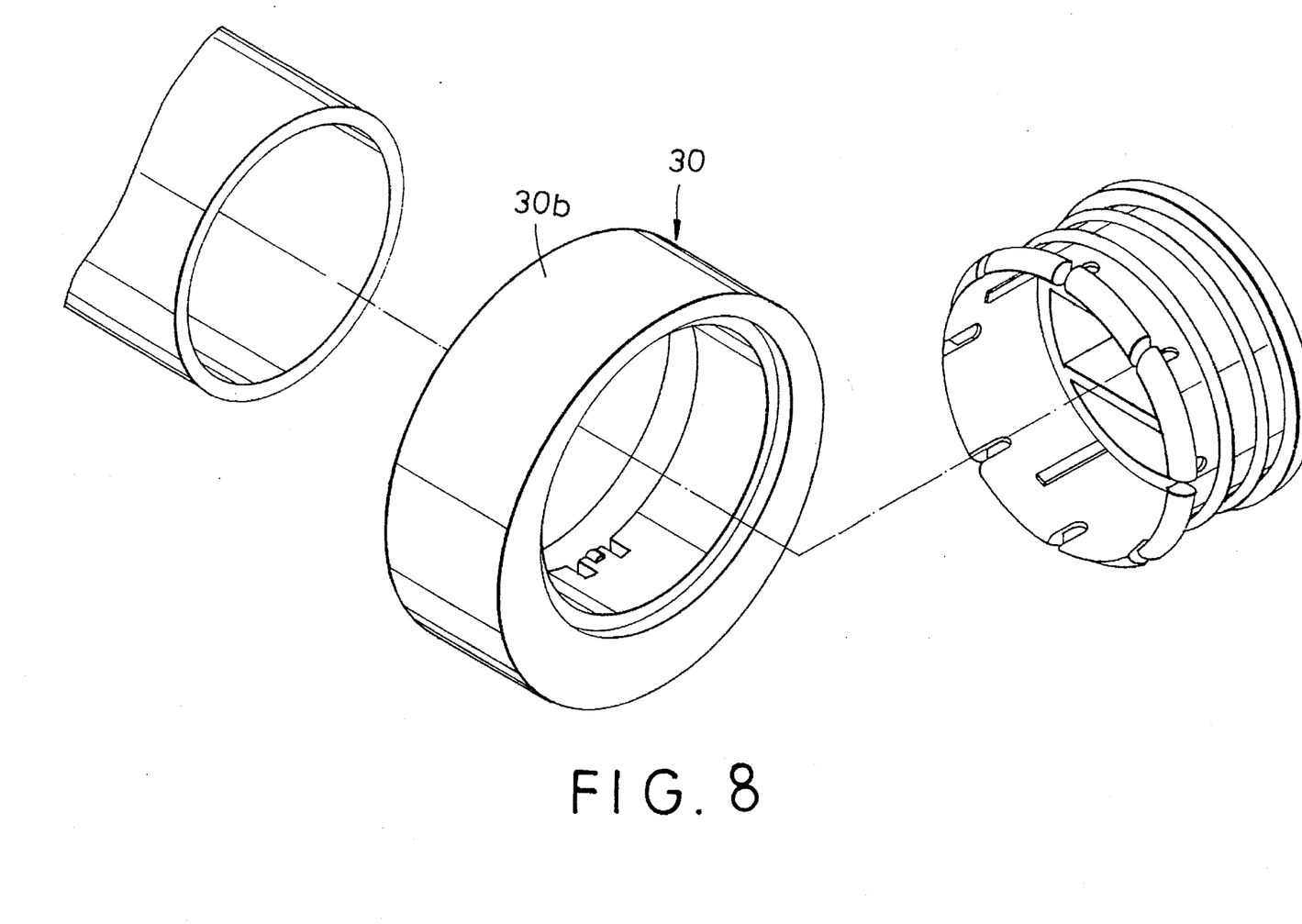
FIG. 8 is an exploded view of a third preferred embodiment of this invention shown together with the horizontal wheel-bearing tube of the exerciser shown in FIG. 1.

FIG. 8 shows a third preferred embodiment which is similar to the second preferred embodiment in construction except that the eccentric wheel 30 has a circular outer periphery 30b. The features and objects are the same as those of the second preferred embodiment.

With this invention thus explained, it is apparent that numerous modifications and variations can be made without departing from the scope and spirit of this invention. It is therefore intended that this invention be limited only as indicated in the appended claims.

I claim:

1. A wheel assembly for an exerciser, said exerciser including a horizontal wheel-bearing tube with an open outer end, said wheel assembly comprising:

a plastic tubular wheel-mounting member including a peripheral wall with an inner portion having an open end for extension of the wheel-bearing tube and an outer portion which has a closing end wall that is formed with an axially extending annular flange projecting from an inner side surface of said closing end wall, said annular flange and said peripheral wall defining cooperatively an annular groove therebetween to receive the open outer end of the wheel-bearing tube when the tube is inserted into said wheel-mounting member via said inner portion in such a manner that said wheel-mounting member is fixed on said wheel-bearing tube, said peripheral wall having an outer outward flange unit adjacent to said closing end wall and an inner outward flange unit located on said inner portion thereof, said inner and outer outward flange units projecting radially and outwardly from said peripheral wall so as to define a wheel-mounting space therebetween, said peripheral wall having a plurality of axially extending slots which are formed therethrough and which are open at said open end of said inner portion of said wheel-mounting member so as to define a plurality of flexible jaws, each of which is located between an adjacent pair of said axially extending slots, said inner outward flange unit being located on said jaws; and an annular wheel sleeved on said wheel-mounting member between said inner and outer outward flange units, said wheel having an intermediate narrowed inner wall section and two enlarged end inner wall sections which are located on two opposite sides of said narrowed inner wall section and which respectively receive said inner outward flange unit and said outer outward flange unit, said intermediate narrowed inner wall section having an inner diameter slightly smaller than an outer diameter of said inner outward flange unit so that said inner outward flange unit can be compressed due to flexibility of said jaws so as to permit entrance of said wheel into said wheel-mounting space of said wheel-mounting member during assembly such that said jaws cannot be compressed after assembly in order to avoid removal of said wheel from said wheel-mounting member.

2. The wheel assembly as defined in claim 1, wherein said peripheral wall of said wheel-mounting member further has a plurality of axially extending engagement ribs projecting from an inner surface thereof, each of said engagement ribs having an inner end portion located between adjacent two of said slots in such a manner that said inner end portions of said engagement ribs and said jaws simultaneously expand radially and outwardly during insertion of the open outer end of the wheel-bearing tube into said wheel-mounting member, thereby enabling said engagement ribs to press against an outer surface of said wheel-bearing tube so as to help fix said wheel-mounting member on said wheel-bearing tube.

3. The wheel assembly as defined in claim 1, wherein said peripheral wall further has a plurality of axially spaced-apart small flanges which project radially and outwardly therefrom between said inner and outer outward flange units and which have outer diameters smaller than those of said inner and outer outward flange units, thereby reducing friction between said wheel and said wheel-mounting member when said wheel rotates on said wheel-mounting member.

4. The wheel assembly as defined in claim 1, wherein said wheel is eccentric and has a resilient engagement tongue projecting inwardly from said intermediate narrowed wall section in such a manner that said engagement tongue is engaged within a selected one of said slots so as to prevent rotation of said wheel on said wheel-mounting member, thereby retaining said wheel stationarily on said wheel-mounting member;

whereby, said engagement tongue can be moved forcibly from the selected one of said slots to another, thereby varying height of rotating axis of said wheel.

5. The wheel assembly as defined in claim 4, wherein said wheel has a multi-sided polygonal outer periphery.

* * * * *